United States Patent [19]

Matsuda

[11] Patent Number: 5,526,892
[45] Date of Patent: Jun. 18, 1996

[54] VEHICLE HAVING A DIFFERENTIAL WITH A VERTICAL DRIVE PINION SHAFT

[75] Inventor: Kenji Matsuda, Sakai, Japan

[73] Assignee: Kubota Corporation, Osaka, Japan

[21] Appl. No.: 312,752

[22] Filed: Sep. 27, 1994

[30] Foreign Application Priority Data

Dec. 7, 1993 [JP] Japan ............................... 5-306146

[51] Int. Cl.$^6$ ................................................ B60K 17/16
[52] U.S. Cl. .................... 180/53.1; 180/53.8; 180/900; 475/900
[58] Field of Search ................................. 180/337, 344, 180/370, 374, 375, 900, 53.1, 53.8; 74/15.2, 15.4, 718; 475/900

[56] References Cited

U.S. PATENT DOCUMENTS

| 4,513,834 | 4/1985 | Hayashi et al. | 180/370 |
| 4,804,056 | 2/1989 | Toshikuni et al. | 180/900 |

FOREIGN PATENT DOCUMENTS

| 527896 | 11/1957 | Italy | 180/53.1 |
| 58-19822 | 2/1983 | Japan . | |
| 2-102924 | 8/1990 | Japan . | |

*Primary Examiner*—Mitchell J. Hill
*Attorney, Agent, or Firm*—Fisher & Associates

[57] ABSTRACT

A vehicle including a change speed device having an output shaft for outputting drive from an engine in varied speeds, and a differential having a drive pinion shaft for receiving output of the change speed device. The output shaft of the change speed device extends substantially horizontally, while the drive pinion shaft of the differential extends substantially vertically. A bevel gear mechanism transmits drive between the output shaft of the change speed device and the drive pinion shaft of the differential. The drive pinion shaft defines a pinion meshed with a ring gear of the differential in a top region of the differential. The drive pinion shaft has a brake for braking the vehicle. The brake includes a brake drum attached to the drive pinion shaft, and a brake shoe for engaging the brake drum.

12 Claims, 4 Drawing Sheets

10
VEHICLE HAVING A DIFFERENTIAL WITH A VERTICAL DRIVE PINION SHAFT

BACKGROUND OF THE INVENTION

1. Field of the Invention

The present invention relates to a vehicle, such as a tractor or riding lawn mower, having a change speed device and a differential arranged adjacent each other in particular.

2. Description of the Related Art

In a tractor or riding lawn mower of the type noted above, as disclosed in Japanese Utility Model Publication Kokai No. 58-19822 (corresponding to U.S. Pat. No. 4,513,834), engine output is transmitted to a rear differential through a change speed device such as a hydrostatic stepless transmission or gear type transmission. The change speed device and differential are arranged adjacent each other in order to achieve compactness by reducing the length, longitudinally of the vehicle, of a transmission line including the change speed device and differential. The change speed device has an output shaft extending horizontally, while the rear differential has a drive pinion shaft also extending horizontally to act as an input shaft thereof. The output shaft and input shaft are vertically displaced from each other. To transmit output of the change speed device to the rear differential, it is necessary to provide an intermediate shaft extending also horizontally between the output shaft and drive pinion shaft, and transmission gearing for interlocking the output shaft and intermediate shaft and the intermediate shaft and drive pinion shaft. In the embodiment described in the above publication, for example, output of the change speed device is transmitted to the rear differential through a plurality of intermediate shafts and transmission gearings.

The construction including a plurality of intermediate shafts and transmission gearings for transmitting output of the change speed device to the rear differential is large and complicated, and involves a cost increase. Such a transmission structure requires a space forwardly of the rear differential and below the change speed device. Thus, this space cannot be used for other purposes.

SUMMARY OF THE INVENTION

An object of the present invention is to provide a transmission structure for simplifying drive transmission from a change speed device to a differential.

Another object of the invention is to dispense with a transmission device for transmitting output of a change speed device to a rear differential, to make effective use of a space thereby made available which is defined by a front wall of the differential and a bottom wall of the change speed device.

A further object of the invention is to provide a differential which gives a good location for installing a rear wheel brake.

A still further object of the invention is to provide a compact construction for enabling a PTO line to extend from a differential to drive a front wheel transmission or the like.

The above objects are fulfilled, according to the present invention, by a transmission structure including a change speed device having an output shaft extending substantially horizontally, a differential having a drive pinion shaft acting as an input shaft thereof and extending substantially vertically for receiving output of the change speed device, and a bevel gear mechanism for transmitting drive between the output shaft of the change speed device and the drive pinion shaft of the differential.

In the above structure, the output shaft of the change speed device extends substantially horizontally as in the prior art. However, the drive pinion shaft acting as the input shaft of the differential is placed to extend substantially vertically. The bevel gear mechanism effects a drive transmission involving a change of direction of the transmission line from the output shaft to the drive pinion shaft. This structure dispenses with a plurality of intermediate shafts and transmission gearings attached thereto as used in the prior art, thereby simplifying the drive transmission from the change speed device to the differential.

Particularly where the drive pinion shaft is disposed in an upper portion of the differential, a space is formed forwardly of the differential and below the change speed device. This space may be used for accommodating, for example, a front wheel driving transmission mechanism or a PTO mechanism for driving a grass cutting unit as necessary.

Further, a space is provided in an upper region of the drive pinion shaft for accommodating a rear wheel brake.

With the drive pinion shaft extending vertically, a PTO pinion shaft may be disposed to extend horizontally for meshing with a ring gear of the differential. This PTO line may be used to drive front wheels, for example.

Other features and advantages of the present invention will be apparent from the following description of embodiments to be had with reference to the drawings.

DESCRIPTION OF THE PREFERRED EMBODIMENTS

The present invention will be described as embodied into a riding lawn mower.

Figure 1:
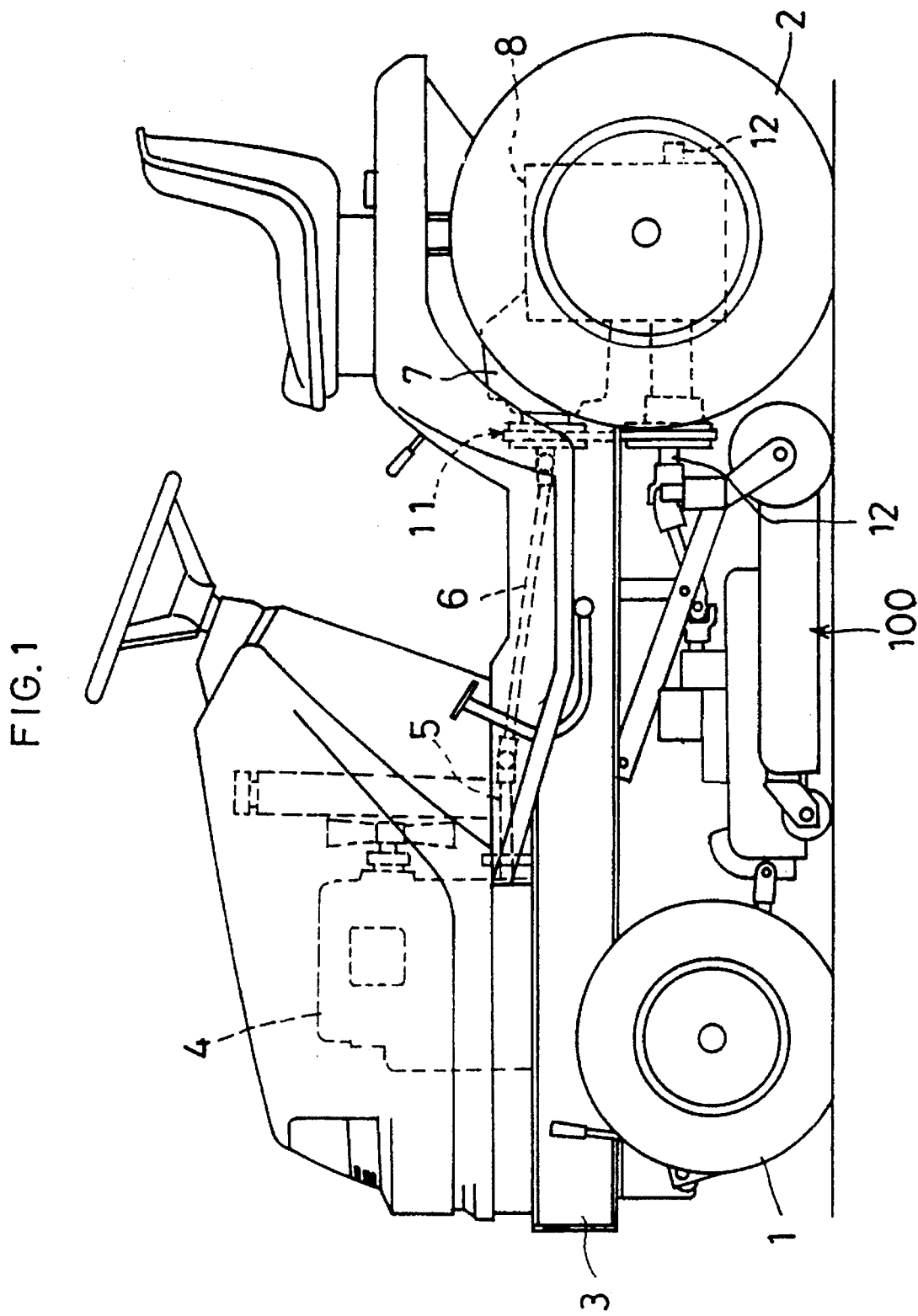
FIG. 1 is a side elevation of a riding lawn mower according to the present invention.

FIG. 1 shows a mid-mount type riding lawn mower having a grass cutting unit 100 disposed between front wheels 1 and rear wheels 2. This lawn mower is a four wheel steering type, i.e. both front wheels 1 and rear wheels 2 being dirigible, and the rear wheels 2 are drive wheels. The lawn mower has a vehicle frame 3 supporting an engine 4 in a front region thereof. Power of the engine 4 is transmitted from an engine output shaft 5 through an intermediate transmission shaft 6 extending under a driver's section, to an input shaft 7a of a hydrostatic stepless transmission 7 acting as a change speed device. Output of the hydrostatic stepless transmission 7 is transmitted to the rear wheels 2 through a differential 9 mounted in a transmission case 8.

Figure 2:
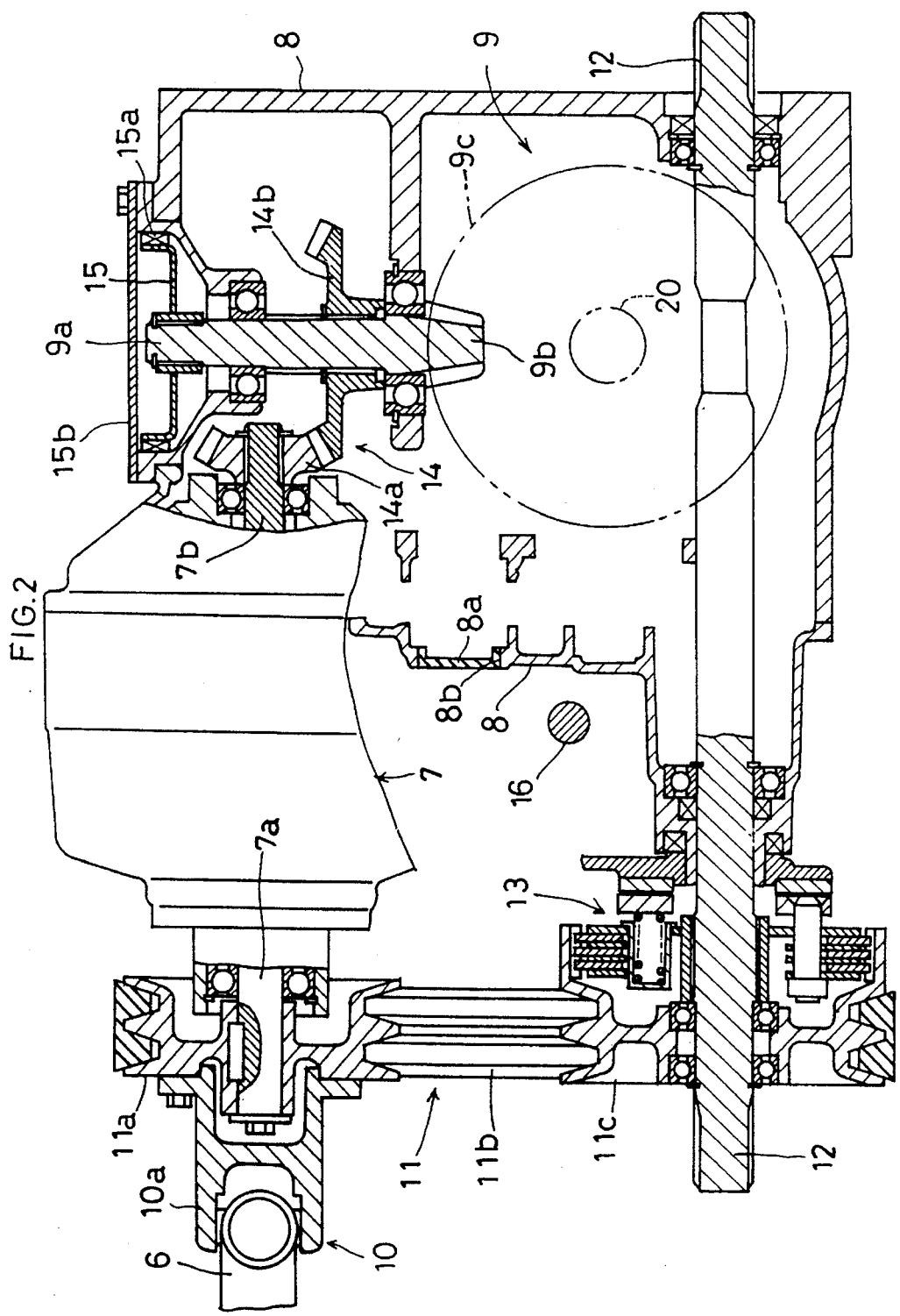
FIG. 2 is a side view in vertical section of a drive transmitting mechanism between a change speed device and a differential.
Figure 3:
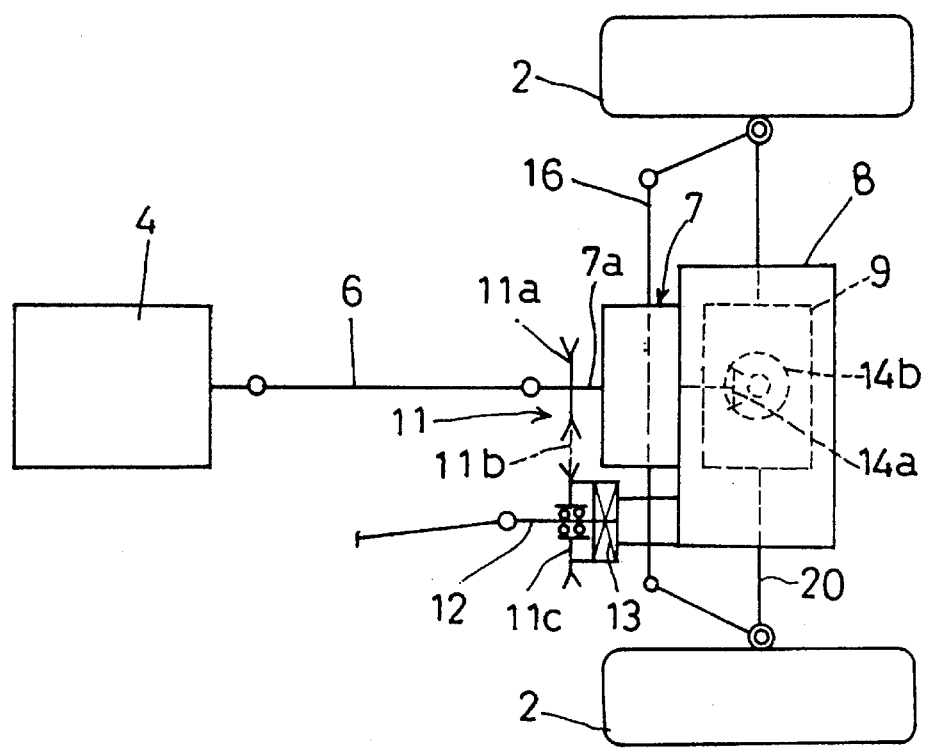
FIG. 3 is a schematic view of a transmission system.

As shown in FIG. 2, a belt transmission mechanism 11 is provided at a connection between the intermediate transmission shaft 6 and the input shaft 7a of the hydrostatic stepless transmission 7. This belt transmission mechanism 11 acts as a PTO mechanism for taking engine power, which is at the same rotating rate as the engine, directly out of the connection between the shafts 6 and 7a. Specifically, a universal joint 10 is connected to an end of the intermediate transmission shaft 6. The universal joint 10 has a coupling flange 10a to which a side wall of a drive pulley 11a of the belt transmission mechanism 11 is attached. The input shaft 7a of the hydrostatic stepless transmission 7 is keyed to a boss of the drive pulley 11a. A belt 11b is wound around this drive pulley 11a and a driven pulley 11c supported on a PTO shaft 12 through bearings. A multidisk type PTO clutch 13 is provided between the driven pulley 11c and PTO shaft 12. The belt transmission mechanism 11 is operable to make and break transmission of the engine power to the PTO shaft 12. As seen from FIG. 3, the PTO shaft 12 extends through a lower left region of the transmission case 8, and under a rear axle 20. The PTO shaft 12 has a forward end thereof connected to the grass cutting unit 100 to rotate cutting blades thereof. A rear end of the PTO shaft 12 is accessible to the outside for connection to a drive shaft of a varied working implement.

Thus, the PTO shaft 12 is driven by power branched from the input shaft 7a of the hydrostatic stepless transmission 7 and transmitted through the belt transmission mechanism 11. This structure enables adoption of an inexpensive one-shaft type hydrostatic stepless transmission. This has an advantage of economy over a structure employing a two-axis type hydrostatic stepless transmission having one output shaft used for propelling purposes and the other used without speed variation for PTO purposes.

The hydrostatic stepless transmission 7 has an output shaft 7b projecting horizontally from a rear position thereof. The differential 9 has a drive pinion shaft 9a extending substantially perpendicular to the output shaft 7b, i.e. extending vertically. Power transmission between the output shaft 7b and drive pinion shaft 9a is effected through a bevel gear mechanism 14. The bevel gear mechanism 14 includes a first bevel gear 14a fixed to a free end of the output shaft 7b, and a second bevel gear 14b fixed to the drive pinion shaft 9a. The drive pinion shaft 9a defines a pinion 9b at a lower free end thereof. The drive pinion shaft 9a is rotatably supported by the transmission case 8 through two bearings, with the pinion 9b engaging a top portion of a ting gear 9c. The lower bearing supports the drive pinion shaft 9a between the pinion 9b and second bevel gear 14b. The upper bearing supports the drive pinion shaft 9a in an upper region thereof. Thus, the pinion 9b and bevel gear mechanism 13 are arranged adjacent each other to contribute to a close arrangement of the hydrostatic stepless transmission 7 and differential 9.

A brake drum 15 is fixed to an upper free end of the drive pinion shaft 9a. The brake drum 15 is engageable by a brake shoe 15a operable by a control mechanism not shown. The brake drum 15 and brake shoe 15a are covered by a lid 15b which is removable to provide easy access thereto.

A tie rod 16 forming pan of a front wheel steering mechanism extends transversely of the vehicle through a space defined by a front surface of the transmission case 8, the hydrostatic stepless transmission 7 and PTO shaft 12.

Reference numeral 8a in FIG. 2 denotes a cover for a perforation 8b formed in a front wall of the transmission case 8. This perforation 8b allows passage of a transmission shaft for driving the front wheels as in a modified embodiment described hereinafter.

Modified Embodiments

Figure 4:
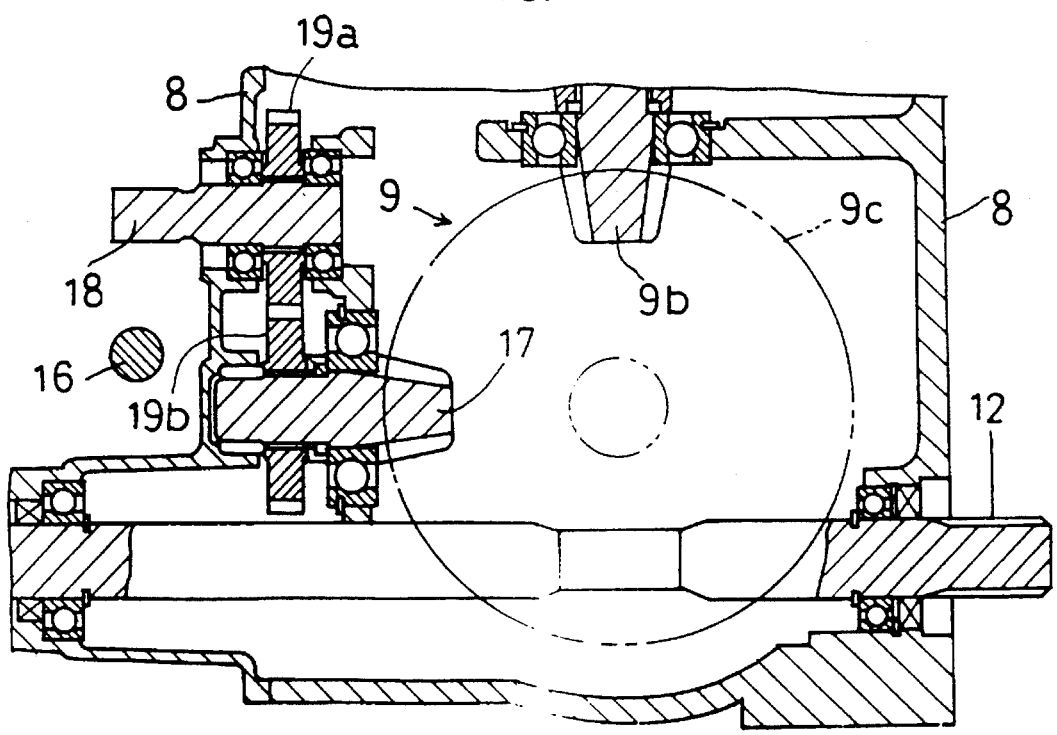
FIG. 4 is a side view in vertical section of a transmission case in a first modification.

Referring to FIG. 4, the transmission case 8 is adaptable from a two-wheel drive mode to a four-wheel drive mode. The front wall of transmission case 8 supporting the PTO shaft 12 may also support a front wheel pinion shaft 17 and a front wheel transmission shaft 18. The pinion shaft 17 defines a pinion for engaging the ring gear 9b of the differential 9. Two gears 19a and 19b are mounted on the pinion shaft 17 and transmission shaft 18, respectively, to transmit power therebetween. The transmission shaft 18 is connected to the front wheels 1 through a drive shaft and a front differential not shown. In this embodiment, the pinion shaft 17 and rear axles 20 are at substantially the same height above the ground, with the PTO shaft 12 extending therebelow.

Figure 5:
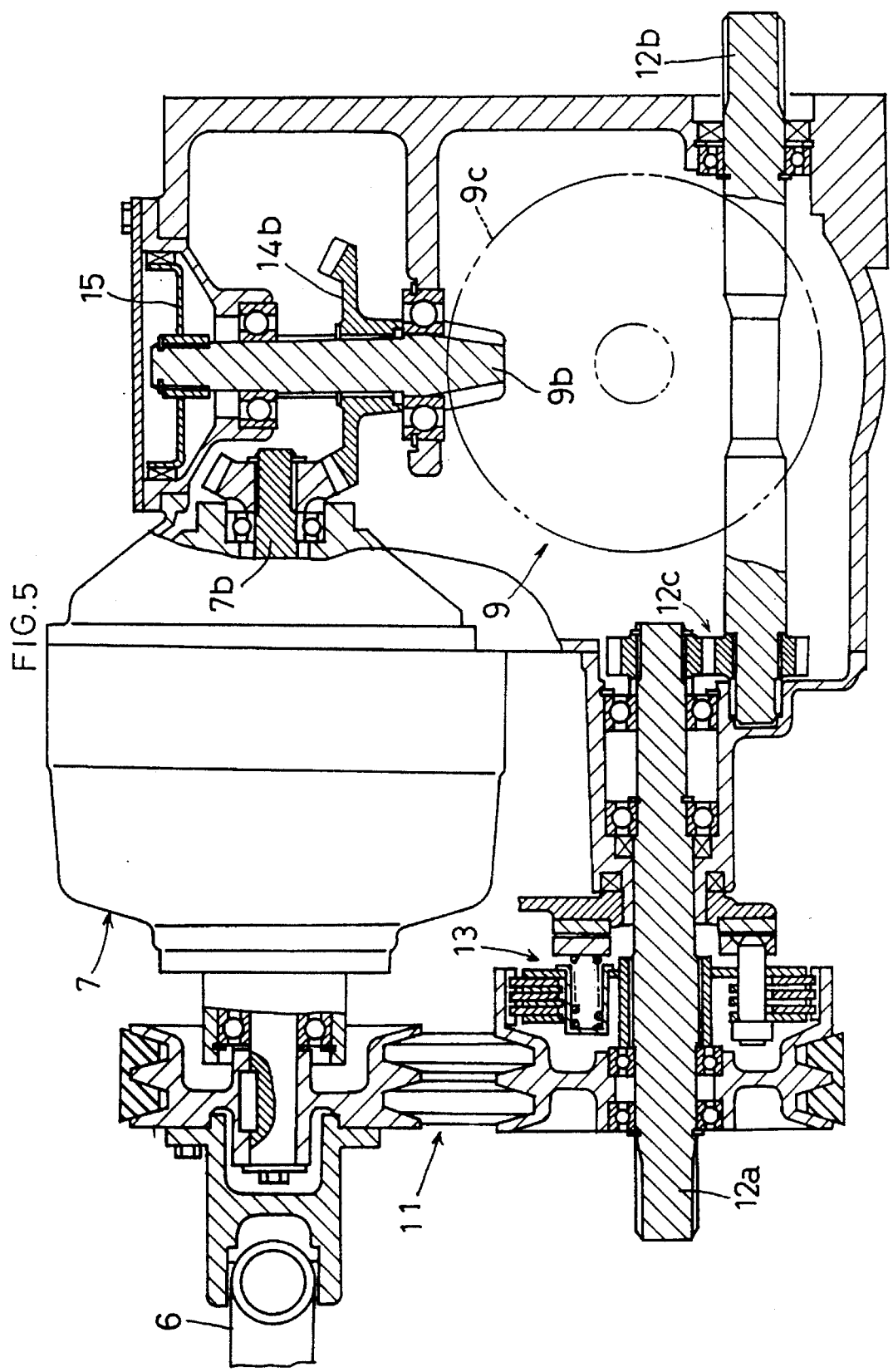
FIG. 5 is a side view in vertical section of a transmission case in a second modification.

FIG. 5 shows a further modification which is substantially the same as the first embodiment except the PTO shaft 12. The PTO shaft 12 in this embodiment is longitudinally divided into a first PTO shaft 12a and a second PTO shaft 12b interlocked through gearing 12c. The rear, second PTO shaft 12b is inserted forward from the rear of the transmission case 8, and connected to the first PTO shaft 12a through the gearing 12c. The rear, second PTO shaft 12b may be removed as desired when out of use.

The feature relating to the mounting positions of the differential 9 and the rear brake, and the feature relating to the power takeoff from the differential 9 to the front wheel transmission line, may be implemented to provide the advantages of the present invention without being combined with the feature that the transmission 7 and differential 9 are arranged adjacent each other.

What is claimed is:

1. A vehicle having drive wheels rotatable by an engine, comprising:
   a change speed means having an input shaft connected to an engine output shaft, and an output shaft for outputting drive in varied speeds, said output shaft extending substantially horizontally;
   a differential disposed adjacent said change speed means for transmitting output of said change speed means to said drive wheels, said differential having a drive pinion shaft extending substantially vertically; and
   a bevel gear means for transmitting drive between said output shaft of said change speed means and said drive pinion shaft of said differential.

2. A vehicle as defined in claim 1, wherein said output shaft of said change speed means is disposed at a greater height than an axle of said drive wheels.

3. A vehicle as defined in claim 1, further comprising a PTO shaft driven by said engine output shaft and extending substantially horizontally through a region below an axle of said drive wheels.

4. A vehicle as defined in claim 3, further comprising transmission means for transmitting drive from said input shaft of said change speed means to said PTO shaft.

5. A vehicle having drive wheels rotatable by an engine, comprising:
   a change speed means having an input shaft connected to an engine output shaft, and an output shaft for outputting drive in varied speeds, said output shalt extending substantially horizontally;
   a differential disposed adjacent said change speed means for transmitting output of said change speed means to said drive wheels, said differential having a drive pinion shaft extending substantially vertically wherein said drive pinion shaft defines a pinion meshed with a ring gear of said differential in a top region of said ring gear; and
   a bevel gear means for transmitting drive between said output shaft of said change speed means and said drive pinion shaft of said differential.

6. A vehicle as defined in claim 5, further comprising:

front wheels and rear wheels rotatable by said engine wherein said rear wheels are said drive wheels;

a front wheel transmission means for driving said front wheels including a from wheel pinion shaft having a pinion meshed with said ring gear, said front wheel pinion shaft extending substantially horizontally; and wherein said bevel gear means includes a first bevel gear mounted on said output shaft of said change speed means and a second bevel gear mounted on the other end of said drive pinion shaft.

7. A vehicle as defined in claim 6, wherein said output shaft of said change speed means is disposed at a greater height than an axle of said rear wheels.

8. A vehicle as defined in claim 6, wherein said front wheel pinion shaft is disposed at substantially the same height as an axle of said rear wheels.

9. A vehicle as defined in claim 6, further comprising a PTO shaft driven by said engine output shaft and extending substantially horizontally through a region below said axle of said rear wheels.

10. A vehicle having drive wheels rotatable by an engine, comprising:

a change speed means having an input shaft connected to an engine output shaft, and an output shaft for outputting drive in varied speeds, said output shaft extending substantially horizontally;

a differential disposed adjacent said change speed means for transmitting output of said change speed means to said drive wheels, said differential having a drive pinion shaft extending substantially vertically;

a bevel gear means for transmitting drive between said output shaft of said change speed means and said drive pinion shaft of said differential;

a PTO shaft driven by said engine output shaft and extending substantially horizontally through a region below an axle of said drive wheels; and a transmission means for transmitting drive from said input shaft of said change speed means to said PTO shaft wherein said transmission means comprises a belt transmission mechanism.

11. A vehicle having drive wheels rotatable by an engine, comprising:

a change speed means having an input shaft connected to an engine output shaft, and an output shaft for outputting drive in varied speeds, said output shaft extending substantially horizontally;

a differential disposed adjacent said change speed means for transmitting output of said change speed means to said drive wheels, said differential having a drive pinion shaft extending substantially vertically wherein said drive pinion shalt has a brake means for braking said drive wheels; and a bevel gear means for transmitting drive between said output shaft of said change speed means and said drive pinion shaft of said differential.

12. A vehicle as defined in claim 11, wherein said brake means includes a brake drum attached to said drive pinion shaft, and a brake shoe for engaging said brake drum.

* * * * *